C. S. HARDY.
HAM PUMP.
APPLICATION FILED JULY 17, 1909.
982,671.
Patented Jan. 24, 1911.
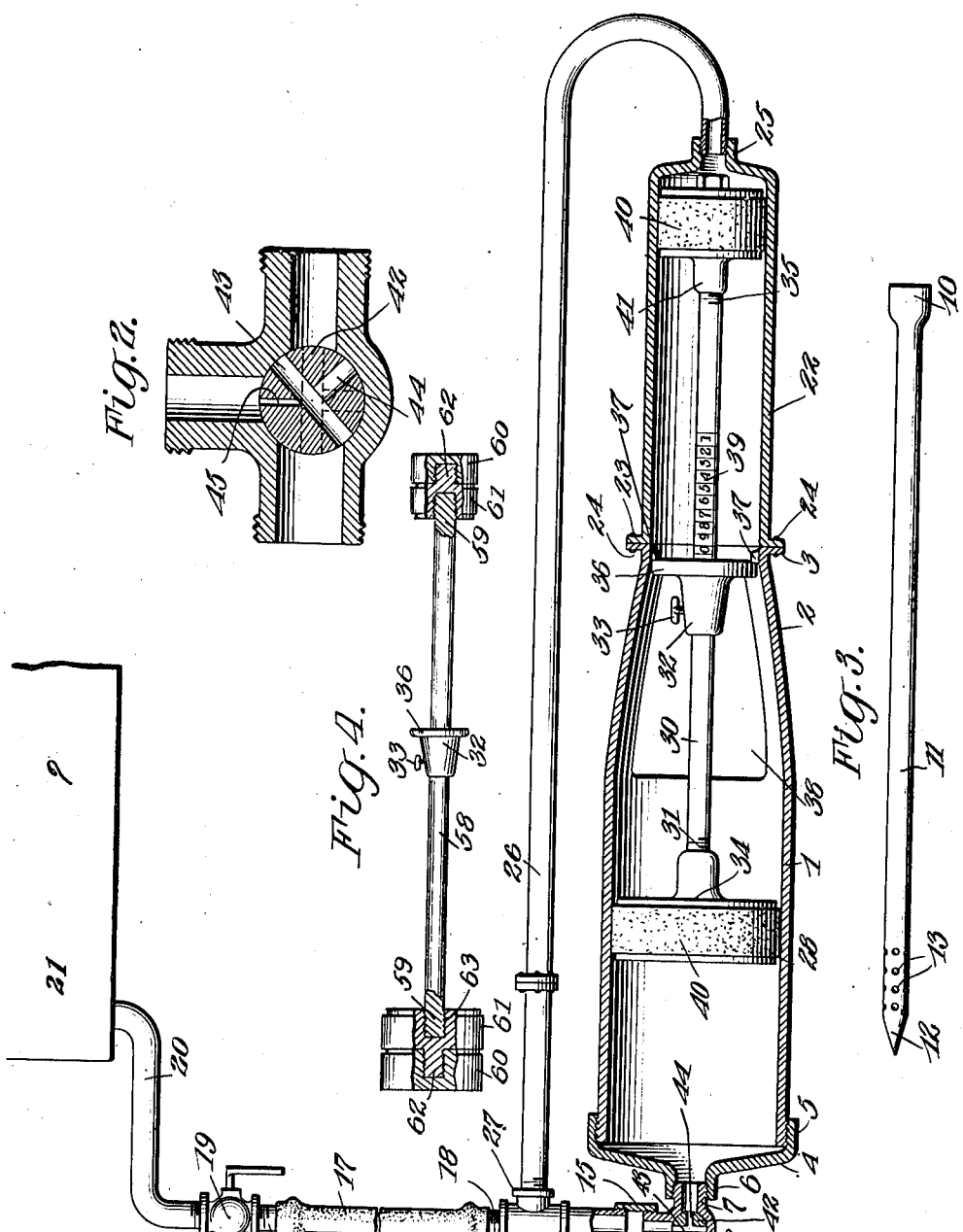
WITNESSES
INVENTOR
CHARLES S. HARDY
BY
ATTORNEYS

UNITED STATES PATENT OFFICE.

CHARLES S. HARDY, OF SAN DIEGO, CALIFORNIA.

HAM-PUMP.

982,671.  Specification of Letters Patent.  Patented Jan. 24, 1911.

Application filed July 17, 1909. Serial No. 508,220.

*To all whom it may concern:*

Be it known that I, CHARLES S. HARDY, a citizen of the United States, and a resident of San Diego, in the county of San Diego and State of California, have made certain new and useful Improvements in Ham-Pumps, of which the following is a specification.

My invention is an improvement in ham pumps and consists in certain novel constructions and combinations of parts, hereinafter described and claimed.

The object of the invention is to provide a pump for forcing pickle into hams, wherein the plunger will be operated by the pressure of the pickle to alternately fill and discharge the barrel of the pump.

Referring to the drawings forming a part hereof:—Figure 1 is a longitudinal section of the pump; Fig. 2 is an enlarged section of the three-way valve; Fig. 3 is a plan view of the needle, and Fig. 4 is a side view partly in section of a modified form of plunger.

The embodiment of the invention shown in the drawings, consists of a cylinder composed of two sections of unequal cross section, and the larger section 1 is of equal cross section throughout the greater portion of its length, but tapers as at 2 toward the smaller section 22. Each of the sections is provided at its meeting end with lateral flanges 3 and 23 respectively, and the flanges are connected by rivets or bolts 24. The opposite end of the section 1 is externally threaded and is engaged by a cap 4, to be presently described. The cap 4 is provided with an annular flange 5, internally threaded for engaging the end of the section 1 and with a nipple 6, internally threaded, which is engaged by one of the ends 7 of a three-way valve 8. The said valve at its opposite end 9 is engaged by the enlarged end 10 of the needle 11, the said end being internally threaded, and the needle is pointed at its opposite end as at 12, and provided with a plurality of openings 13 behind the point. The lateral branch 14 of the valve is engaged by one end of a sleeve 15, which connects the said branch with the end of a tee 16. A flexible tube 17 of suitable length is provided at each end with a screw threaded nipple 18, one of which is threaded into the opposite end of the tee and the other into the casing of the throttle valve 19, which is connected by a pipe 20, with the reservoir 21. The section 22 at its outer end is provided with a nipple 25, and the pipe 26 is threaded into the nipple, and connects the said section with the lateral branch 27 of the tee 16.

A plunger is movable in the cylinder, the said plunger comprising a head 28, moving in the section 1, and a head 29 moving in the section 22 and the stem 30 is threaded at its ends as at 31 and 35 into internally threaded bosses 34 and 41 on the respective heads. A sleeve 32 is slidable on the stem between the bosses and is provided with a set screw 33 for securing it in adjusted position. The stem is also provided with a lateral annular flange 36, which is adapted to engage stops 37, in the cylinder, for limiting the backward stroke of the plunger. The cylinder at its tapered portion is provided with one or more openings 38, and the portion of the stem 30 adjacent to the sleeve is provided with a scale 39 inscribed thereon. It will be noticed that both of the heads of the plunger are provided with packings 40, for engaging the interior of the respective sections.

The three-way valve is provided with a plug 42, having a transverse passage 43, and a lateral branch passage 44, leading from the passage 43 at approximately its center and with a small passage 45 leading from the passage 43 at an acute angle. By the proper manipulation of the plug, the section 1 of the cylinder and the needle may be connected or the said section and the reservoir, and the reservoir and the needle may be connected either by the passages 43 and 44, or the passages 45 and 43. In the latter case the connection is restricted while in the former it is free.

The operation of the device is as follows:—The three-way valve is arranged as shown in Fig. 1 and the plunger is moved backward away from the said valve by the pressure of the liquid in the reservoir acting on the head 28 in the section 1 of the cylinder, the throttle valve 19 being opened. When the said section is supplied with sufficient liquid the valve is turned to the position shown in Fig. 2 and while in that position the needle is inserted into the ham. As will be evident from inspection of Fig. 2, the passage 45 connects the reservoir with the passage 43, which is partially open and permits a small amount of the pickle to flow into the needle as it is entering the ham. This small amount is sufficient to expel the air from the needle so that injurious effects due to this cause are eliminated. After the needle has fully entered the ham, the valve plug is turned to connect the section 1 of the cylinder and the needle by means of the passage 43. The pressure of the reservoir is now cut off from the larger head but passing through the pipe 26 acts on the smaller head, which forces the plunger downward and discharges the liquid from the cylinder through the needle into the ham. When the contents of the cylinder are discharged the process is repeated.

It will be evident from the description, that the pump is operated altogether by the pressure of the pickle in the reservoir, the said pressure acting at all times upon the small head and intermittently on the large head, the plunger being thus operated by the difference in pressure.

The sleeve 32 may be adjusted on the stem to vary the stroke of the plunger and the scale indicates the length of the stroke, the end of the sleeve acting as an indicator.

As shown in Fig. 1 a check valve is arranged between the needle and the valve 45. The said check valve comprises a casing 51, having a valve seat 52, with which coöperates a valve 53. The valve is provided with a stem 54 which passes through a diaphragm 55, in the casing and is provided with a head 57, at its outer end and a spring 56 is arranged between the head and the diaphragm. The check valve is designed to prevent regurgitation of the fluid from the needle.

If desired, the form of plunger head shown in Fig. 4 may be made use of to vary the capacity of the cylinder, and consequently the amount of liquid discharged at each stroke of the pump. The said head comprises a stem 58, on which is arranged a sleeve 32, having the annular flange 36 and retained in adjusted position by the set screw 33, and the ends of the stem are threaded as at 59, and engage threaded openings in the center of one face of disks 60, which form the head. Filling disks 61 are made use of to lengthen the head whereby to decrease the capacity of the cylinder, and each of the said filling disks is provided on one face with a threaded stem 62, and on the other with a threaded depression 63, for receiving the stem of the adjacent disk or the end of the stem 58 as the case may be. It will be evident that by inserting or removing the filling disks, the length of the head may be increased or diminished. The filling disks are inserted between the disks 60 and the stem as clearly shown in the said figure.

It will be evident that by turning the valve plug 42 to connect the section of the cylinder alternately with the reservoir and the needle, a charge will be permitted to enter the said section from the reservoir and be discharged therefrom through the needle.

The invention in its broadest form comprises a cylinder, a plunger working therein, and having heads of unequal cross section, and a connection between each end of the cylinder and a source of fluid under pressure together with the discharge pipe at the end adjacent to the larger head of the plunger and the valve for alternately connecting the said section of the cylinder with the reservoir and with the discharge pipe.

I claim:—

1. In combination with a reservoir of pickle under pressure, a pump comprising alined sections of unequal cross section, a plunger slidable therein and having a head movable in each section, a stem connecting the heads, a needle, a connection between the large section of the cylinder and the needle, a three-way valve interposed in the connection, a connection between the three-way valve and the reservoir and a pipe leading from the said connection between the valve and the reservoir to the small section of the cylinder.

2. The combination with a source of fluid under pressure, of a pump comprising alined sections of unequal cross section, the larger section having an outlet at the end remote from the other section, a plunger having a head in each section, a rigid connection between the heads, a three-way valve interposed in the outlet, a connection between the valve and the reservoir, and a connection between the reservoir and the end of the small section of the cylinder, remote from the large section.

3. The combination with a reservoir of fluid under pressure, of a pump comprising alined sections of unequal cross section, a plunger having a head in each section, a rigid connection between the heads, means for adjusting the stroke of the plunger, a connection between the outer end of each section of the cylinder and the reservoir, said larger section having an outlet, and means for simultaneously closing the connection between the large section and the reservoir and opening the outlet.

4. The combination with a reservoir of fluid under pressure, of a pump comprising alined sections of unequal cross section, the large section having an outlet, a plunger having a head in each section, a rigid connection between the heads, a connection between the outer end of each section of the cylinder and the reservoir, and a common valve for controlling the outlet and the connection of the large section with the reservoir.

5. The combination with a reservoir of fluid under pressure, of a pump comprising alined sections of unequal cross section, a plunger having a head in each section, a rigid connection between the heads, means for varying the stroke of the plunger, a connection between the outer end of each section and the reservoir, a discharge pipe for the large section, and means for alternately closing the discharge pipe and the connection of the large section with the reservoir.

6. The combination with a reservoir of fluid under pressure, of a pump comprising alined sections of unequal cross section, a plunger having a head in each section, a rigid connection between the heads, means for varying the stroke of the plunger, a connection between the outer ends of the sections and the reservoir, a discharge pipe for the large section, and means for alternately closing the discharge pipe and the connection of the large section with the reservoir.

7. In a device of the class described, a pump comprising alined sections of unequal diameter, a plunger having a head in each section, a stem connecting the heads, a stop in the large section and a sleeve provided with a flange for engaging the stop adjustable on the stem, said stem having a scale for the purpose specified.

8. In a device of the class described, a pump comprising alined sections of unequal diameter, a plunger having a head in each section, a stem connecting the heads, a fixed stop, a sleeve adjustable on the stem and provided with a flange for engaging the stop.

9. In a device of the class described, a pump comprising alined sections of unequal diameter, a plunger having a head in each section, a stem connecting the heads, said stem having threaded ends, and the heads having threaded openings, and filling disks arranged between the heads and the stem, said disks having an opening for receiving the stem and a threaded stem for engaging the opening of the head.

10. In a device of the class described, a pump comprising alined sections of unequal diameter, a plunger having a head in each section, a stem connecting the heads, and means for increasing or decreasing the length of the heads.

11. The combination with a reservoir of fluid under pressure, of a pump comprising alined sections of unequal diameter, the larger section having an outlet, a plunger having a head in each cylinder, a rigid connection between the heads, a connection between the outer end of each section and the reservoir, a common valve for controlling the outlet and the connection of the large section with the reservoir, and a check valve arranged in the outlet.

12. In combination with a source of fluid under pressure, of a pump comprising alined sections of unequal diameter, of a plunger having a head in each section, a stem connecting the heads, a needle, a connection between the larger section and the needle, a three-way valve interposed in the connection, a check valve between the three way valve and the needle, a connection between the three-way valve and the reservoir, and a pipe leading from the said connection between the three-way valve and the reservoir to the small section.

13. The combination with a source of fluid under pressure, of a pump comprising alined sections connected with the source, a plunger having a head in each section, a rigid connection between the heads, a three-way valve in the connection between the large section and the source, and provided with a discharge opening, and a check valve in the discharge opening.

14. In a device of the character specified, a cylinder a plunger having ends of unequal cross section, a source of fluid under pressure and normally in communication with the end of the cylinder adjacent to the smaller end of the plunger, a discharge pipe at the other end of the cylinder, and means for alternately connecting said end with the source and with the discharge pipe.

CHARLES S. HARDY.

Witnesses:
AARON C. COFFEEN,
CLEMENT H. WESCOTT.